United States Patent [19]

Walters et al.

[11] 4,258,776

[45] Mar. 31, 1981

[54] RETREADED TIRE, METHOD AND APPARATUS

[75] Inventors: Noel E. Walters, Tallmadge; William F. Markey, Akron; Duane F. Garman, Cuyahoga Falls, all of Ohio

[73] Assignee: The Goodyear Tire & Rubber Company, Akron, Ohio

[21] Appl. No.: 7,082

[22] Filed: Jan. 29, 1979

[51] Int. Cl.$^3$ .......... B60C 9/20; B60C 11/02; B29H 17/36; B29H 21/01

[52] U.S. Cl. .......... 152/361 R; 152/209 R; 156/96; 51/106 R; 157/13

[58] Field of Search .......... 156/96, 126–130, 156/123, 394, 153; 51/103 R, 106 R; 157/13; 152/209 R, 330 R, 352 R, 361 R

[56] References Cited

U.S. PATENT DOCUMENTS

| | | | |
|---|---|---|---|
| 2,228,212 | 1/1941 | Heintz | 156/96 |
| 2,382,269 | 8/1945 | Stephens et al. | 156/96 |
| 2,697,472 | 12/1954 | Hawkinson | 156/96 |
| 3,002,549 | 10/1961 | Boussu et al. | 157/13 |
| 3,080,899 | 3/1963 | Robertson | 157/13 |
| 3,409,066 | 11/1968 | Antraigne | 157/13 |
| 3,473,596 | 10/1969 | Meixner | 51/106 R |
| 3,897,813 | 8/1975 | Verdier | 152/209 R |
| 3,910,337 | 10/1975 | Pelletier | 157/13 |
| 4,071,071 | 1/1978 | Graves et al. | 157/13 |
| 4,088,521 | 5/1978 | Neal | 156/96 |
| 4,155,392 | 5/1979 | Duderstadt et al. | 152/330 R |

*Primary Examiner*—John E. Kittle
*Attorney, Agent, or Firm*—D. M. Ronyak

[57] ABSTRACT

A retreaded belted tire and a method and apparatus for use in preparing same. The tire is prepared for retreading by removing a portion of the existing crown area rubber material so as to leave not greater than a predetermined amount of rubber material lying radially outward of the belt structure. New tread rubber material of uniform thickness throughout its length and width is added to the prepared tire and the assembly is cured under heat and pressure. When the newly added tread material is unvulcanized rubber, the assembly is cured in a mold having a crown area profile complementary to that of the prepared tire.

9 Claims, 2 Drawing Figures

RETREADED TIRE, METHOD AND APPARATUS

BACKGROUND OF THE INVENTION

The foregoing abstract is not to be taken as limiting the invention of this application and in order to understand the full nature and extent of the technical disclosure of this application reference must be made to the accompanying drawings and the following detailed description.

The invention pertains to a retreaded belted tire and a method of preparing same. It is particularly suited to retreading a heavy-service radial carcass tire of the type having a belt structure including a plurality of cord-reinforced belts the radially outermost of which is substantially narrower than that lying immediately radially inward thereof. These belts cords are typically of wire, aramid, fiberglass or other high modulus material.

Many heavy service radial carcass tires today, such as those used on heavy duty highway trucks (for example, semi-tractors and their trailers) have a belt structure overlying the carcass including three or more layers of belts of varying widths. The radially outermost layer of the belts used in many tire designs is considerably narrower than that of the belt layer lying immediately radially inward thereof. As used herein, "radially outermost" means that which is farthest away from the axis of rotation of the tire. Present retreading methods employ a crown preparation technique for removal of a portion of the existing crown area rubber material which allows substantial quantities, for example, up to 3/16 to ¼ inch in thickness, of the existing rubber material lying radially outwardly of the belt structure to remain on the prepared tire. During previous service of the tire casing this rubber material has been subjected to substantial mechanical action and temperatures above ambient, particularly at the edges of the belt structure. When a new tread is placed over a heavy layer of original rubber material service life of the retreaded tire may be reduced either due to tread separation or separation at the edges of one of the two most radially outward belts. As used herein "radially outward" and related forms means directed away from the axis of rotation of the tire.

It is an object of this invention to provide a method whereby the amount of existing rubber material lying radially outwardly of the belt structure is minimized in the retreaded tire to improve service life of the retreaded tire.

It is another object of the invention to provide a method for retreading a radial carcass belted tire of the type which has its radially outermost belt layer of a width substantially less than that of the belt layer lying immediately radially inward thereof so as to leave not more than ⅛ inch of existing rubber material lying radially outwardly of the edges of the radially outermost two belt layers.

It is still another object of the invention to provide a retreaded radial carcass tire having a dual radius crown area transverse profile, the radius of transverse curvature of the center portion being greater than the radius of transverse curvature of either shoulder portion.

It is a further object of the invention to provide a mold for use in bonding newly added unvulcanized rubber material to a tire prepared for retreading according to the invention, the mold having a radius of curvature complementing that of the tire prepared according to the rubber removal method of the invention.

These and other objects and advantages of the invention will become apparent as the description proceeds.

SUMMARY OF THE INVENTION

A radial carcass tire of the type having a plurality of layers of cord belts the radially outermost of which is substantially narrower than that lying immediately radially inward thereof, is prepared for retreading by removal of the existing crown area rubber material of the tire to within ⅛ inch of the cords at the edges of the two most radially outward layers of belts. As used herein, "radially inward" means directed towards the axis of rotation of the tire. This measurement is taken in a radial plane of the tire. As used herein, a radial plane of a tire is one which contains the axis of rotation of the tire. The existing crown area rubber material is removed to provide a prepared tire having a dual radius crown profile as viewed in a radial plane of the tire. The radius of transverse curvature in a radial plane of the prepared tire in the center portion of the crown profile is greater than that of the shoulder portions of the crown profile, i.e., those portions axially distant from the center portion. After removal of the existing crown area rubber material new rubber material is added to the crown area to form the tread of the retreaded tire. The new rubber material is of substantially constant overall thickness throughout its length and width. The new rubber material may include a precured tread and an uncured or partially cured bonding layer. In this case, precured tread is bonded to the prepared tire by placing the assembly in a curing chamber under heat and pressure. Alternatively, the new rubber material may consist entirely of unvulcanized rubber material. In this case, the prepared tire with the new unvulcanized rubber material is placed in a mold or matrix and cured under heat and pressure. The mold has a crown area profile, as viewed in a radial plane of the mold, which is configured to complement that of the tire prepared as described herein with due allowance for the newly added rubber material. The mold has a dual radius crown area profile as viewed in a radial plane of the mold. The radius of transverse curvature of the crown area of the mold in its center portion is greater than that of the shoulder portions which are located axially outward from the center portion. The center portion of the tire and the mold are approximately of the same axial extent as that of the most radially outward layer of the belt structure of the tire and for which the mold is designed. The shoulder portions correspond to those of the tire for which the mold is designed.

DETAILED DESCRIPTION OF THE INVENTION

A tire of the type having a plurality of cord belts surrounding its crown area wherein the radially outermost belt layer is of substantially less width than the belt layer immediately adjacent thereto, is prepared for renewal of its tread by removal of the existing crown area rubber material to within ⅛ inch of the edges of the two most radially outward belt layers. The rubber may be removed by cutting or buffing methods well known in the art of retreading tires.

Figure 1:
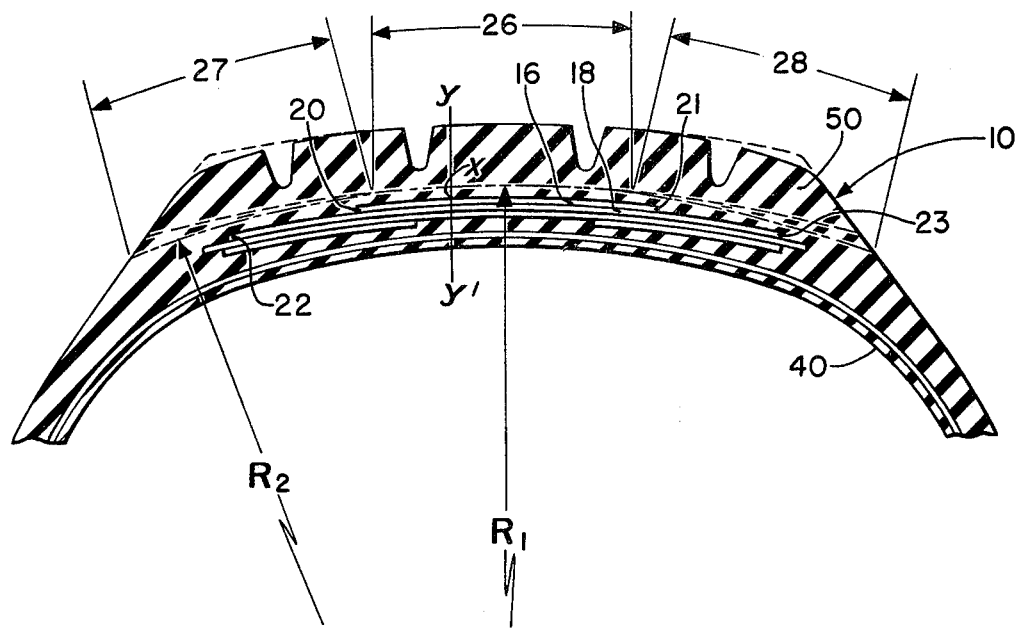
FIG. 1 is a diagrammatic fragmentary sectional view taken along a radial plane of a multi-belted radial carcass tire which has been prepared and retreaded according to the present invention, there being shown in dashed lines a prepared tire casing and retreaded tire according to the prior art, and in chain dot lines a prepared tire casing and in solid lines retreaded tire according to the invention.

Referring to FIG. 1, numeral 10 refers generally to a tire casing prepared for renewal of its tread 50 in accordance with the invention. The tire 10 is of the type having four layers of circumferentially extending cord belts in its crown region wherein the radially outermost of the belt layers, that is, the first belt layer 16 radially inward of the tread, is of substantially less width than that of the second belt layer 18 lying radially inward of the tread. Typically the radially outermost belt layer is from about 30 to 80 percent of the width of the second belt layer radially inward of the tread. In the tire 10 of FIG. 1, the radially outermost belt layer 16 is about 60 percent of the width of the second belt layer 18 radially inward of the tread, although this proportion varies among manufacturers. The existing crown area rubber material of the tire is removed so as to leave no more than ⅛ inch thickness and preferably, no more than 3/32 inch thickness of rubber material lying radially outward the cords of the radially outermost belt layer 16 at the circumferential centerline of the tire. As used herein, thickness is determined by measuring perpendicularly to a tangent to a belt layer contour as viewed in a radial plane of the tire at the point of interest. For example, at point x line y—y' is constructed perpendicular to the tangent at point x to the radially outermost belt layer 16. The center portion of the crown area of a tire, as used herein, corresponds approximately to the axial extent or width of the radially outermost belt layer. The center portion 26 of the crown area of the prepared tire as measured in a radial plane of the tire has a radius of transverse curvature of $R_1$ so as to leave the thickness of the existing rubber material lying radially outward of the radially outermost belt layer 16 no greater than ⅛ inch and preferably no greater than 3/32 inch. In order to not exceed the desired maximum thickness of existing rubber material axially outward of the edges 20,21 of the narrow radially outermost belt layer 16 a different contour must be followed. As used herein, "axially" and related forms means in a direction parallel to the axis of rotation of the tire. To accomplish this, the shoulder portions 27,28 of the tire are buffed according to a radius $R_2$ which is less than the radius $R_1$. The shoulder portions of a tire, as used herein, are those areas located axially outward from the center portion. $R_1$ is preferably at least 1¼ times $R_2$ but not more than 4 times $R_2$. Most preferably, $R_1$ is not more than 3 times $R_2$. As with $R_1$, the controlling factor is that $R_2$ be selected so that not more than ⅛ inch, and preferably, not more than 3/32 inch thickness of existing rubber material will remain radially outward of the axially distant edges of the second belt layer 18 which lies immediately radially inward and adjacent to the narrow belt layer 16.

It is preferred that a minimum amount or skin of existing rubber material remain overlying the belts of the prepared tire. Should the rubber removal step result in exposure of cords of the first or second belt radially inward of the outer periphery of the tire, the exposed cords may be treated with a rubbery material cement in known manner before further processing.

As shown in FIG. 1, the chain dot lines nearest the inner periphery 40 of the tire represent the profile in a radial plane of a tire casing prepared in accordance with the present invention and the dashed lines nearest the inner periphery of the tire represent the profile in a radial plane of the same tire casing when prepared according to the prior art. It is readily apparent that use of the method of the invention results in reduced thickness of the existing rubber material in the shoulder portions 27,28 of the tire 10. The amount of difference between a tire prepared according to the present method and that prepared according to the prior art increases progressively from the edges 20,21 of the narrow radially outermost belt layer 16 of the tire to either of its shoulders.

Following removal of the existing crown area rubber material of the tire as described herein new rubber material of substantially constant thickness throughout its length and width is added to the crown area to form an assembly. The newly added rubber material will form the renewed tread 50 of the retreaded tire. The newly added rubber material extends circumferentially about the tire and substantially spans its crown region. The newly added rubber material may be in the form of a precured tread (not shown) or an unvulcanized rubber material (not shown). In the case of a precured tread an intermediate bonding layer (not shown) is interposed between the prepared tire casing and the precured tread in known manner. In either case, the newly added rubber material for forming a tread on a prepared tire casing is of substantially constant thickness throughout its circumferential and axial dimensions. This assembly results in a retreaded tire in which the thickness of the portions of the rubber material overlying the edges of the two most radially outward layers of the belt structure nearest the shoulders of the retreaded tire are less than in a retreaded tire prepared according to prior art methods.

As shown in FIG. 1, a retreaded tire prepared according to the invention (shown in solid lines) has less thickness of rubber material lying radially outward of the axial extremities of its belt structure than does a tire prepared according to prior art methods (shown in dashed lines). Preferably, the renewed tread is of less thickness at the circumferential centerline of the tire than was the tread of the tire as originally manufactured. Also, the overall width of the tread of the retreaded tire is preferably slightly narrower than that of the tire as originally manufactured. The radius of transverse curvature of the center portion of the periphery of the crown area of the recapped tire as measured in a radial plane of the tire is approximately equal to that of the tire as originally manufactured. The radius of transverse curvature of each of the shoulder portions of the periphery of the crown area of the recapped tire is less than each of the shoulder portions of the tire as originally manufactured. Preferably, the radius of transverse curvature of the center portion of the recapped tire is at least 1¼ times but not more than 4 times that of either of the shoulder portions. Most preferably the radius of transverse curvature of the center portion of the recapped tire is not more than 3 times that of either shoulder portion. When a precured tread is used, the assembly may be cured in known manner in a curing chamber to result in a retreaded tire according to the invention.

When the newly added rubber tread material is unvulcanized, undesired distortion of the tire carcass and flow of rubbery material from the central portion 26 of the crown of the tire 10 toward the shoulder portions 27,28 is prevented by curing the assembly in a mold or matrix having a crown area contour when viewed in a radial plane of the matrix which complements that of the assembly. As used herein, a "radial plane" of the mold or matrix is one which passes through and contains the axis of rotation of the mold or matrix.

Figure 2:
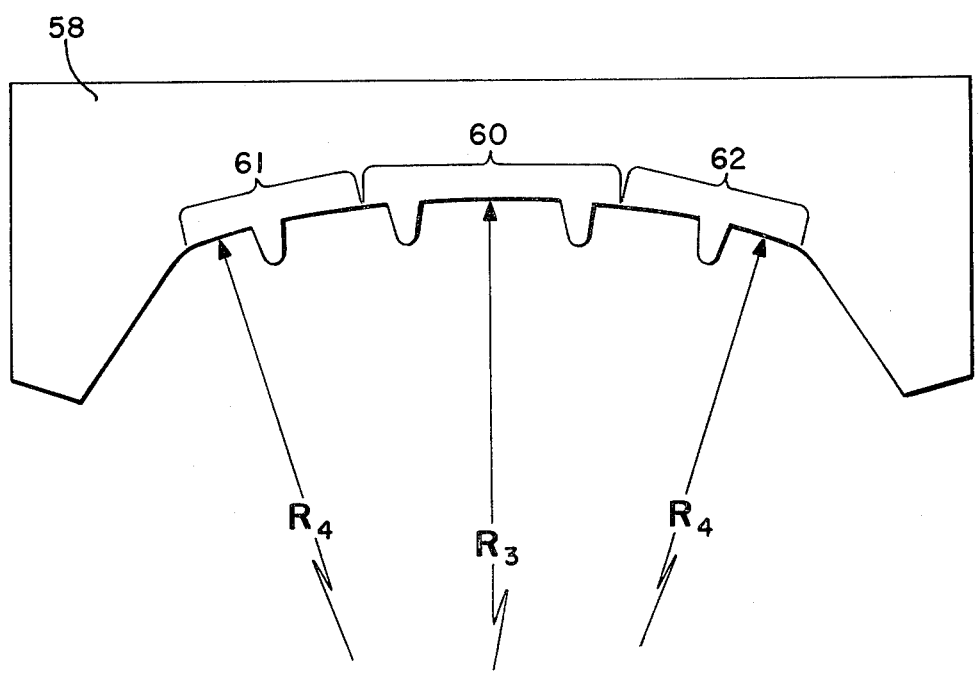
FIG. 2 is a diagrammatic sectional view of the crown area tread ring of a mold for use in making the retreaded tire of this invention, the mold being shown in section taken along a radial plane of the mold.

In FIG. 2 is shown a portion or the tread ring of a matrix 58 suitable for use in curing an assembly of a tire prepared in accordance with this invention over the crown of which has been added unvulcanized rubbery material for formation of a tread on the prepared tire casing. As in the prepared tire casing, the transverse profile of the crown area of the matrix is of a dual radius configuration. The central portion 60 of the crown area of the matrix has a radius of transverse curvature $R_3$ which complements that of the central portion 26 of the crown of a prepared tire $R_1$ with due allowance for newly added rubbery material and expansion of the tire into the matrix. The contours in the shoulder portions 61,62 of the matrix have a radius of transverse curvature $R_4$ which likewise complements the radius of transverse curvature $R_2$ of the shoulder portions 27,28 of the tire casing when prepared in accordance with this invention with due allowance for the newly added rubbery material and expansion of the tire into the mold. Such contour of the matrix 58 inhibits flow of the newly added unvulcanized rubbery material from the central portion of the assembly toward the shoulder portions which would result in an undesirable thickening of the shoulder portions. Also, if the matrix is not matched to the assembly, the tire casing may be distorted during the cure giving rise to stresses at the interface of the prepared tire casing and the newly added rubber material. Such stresses may reduce the service life of the retreaded tire.

Removal of a portion of the existing crown area rubber material in preparation for retreading is commonly performed using a machine controlled by a template. The contour of the control surface of such a template may be obtained by examination of the dimensions of the tire for which it is intended, with particular care being given to the width of the belt layers and location of the endings of the radially outermost two layers of belts of the tire. Such information is available from the tire manufacturer of from examination of a tire sectioned along a radial plane of the tire. While certain representative embodiments and details have been shown for the purpose of illustrating the invention, it will be apparent to those skilled in the art that various changes and modifications may be made therein without departing from the spirit or the scope of the invention.

What is claimed is:

1. In a method of retreading a tire having a plurality of layers of belts spanning its crown area, the radially outermost of which is substantially narrower than that immediately radially inward thereof, including
   (a) removal of the existing crown area rubber material of the tire so as to leave not more than one-eighth inch thickness over the edges of the two most radially outward belt layers to provide a prepared tire having a dual radius crown profile as measured in a radial plane of the tire, the crown profile including a center portion substantially coextensive with the radially outermost belt layer and also including shoulder portions each extending from the proximate axial edge of the radially outermost belt layer axially outward to the corresponding axial edge of the belt layer lying immediately radially inward of the radially outermost belt layer, the radius of transverse curvature of the center portion being greater than that of either shoulder portion;
   (b) adding new rubber material of substantially constant total thickness throughout its length and width; and
   (c) curing under heat and pressure the new rubber material to the prepared tire.

2. The method according to claim 1, wherein the new rubber material is cured to the prepared tire in a mold having a crown area configured to complement that of the tire as prepared through step (b), the mold having a dual radius crown area, the radius of transverse curvature of the centerline portion being greater than the radius of transverse curvature of either shoulder portion.

3. The method according to claim 1, wherein the new rubber material of step (b) includes a precured tread.

4. The method according to claim 1, wherein not more than 3/32 inch thickness of existing rubber material is left over the edges of the two most radially outward belt layers of the prepared tire.

5. The method according to claim 1, wherein the radius of transverse curvature of the center portion of the crown area is at least 1¼ times but not more than 4 times that of either shoulder portion of the crown area.

6. The method according to claim 2, wherein the radius of transverse curvature of the centerline portion of the mold is at least 1¼ times but not more than 4 times that of either shoulder portion of the mold.

7. A retreaded radial carcass tire of the type having a plurality of circumferentially extending belt layers spanning its crown area wherein the outermost belt layer is of substantially less width than that of the belt layer lying immediately radially inward thereof, the existing crown area rubber material of the retreaded tire having been removed so as to leave not more than one-eighth inch thickness over the edges of the two most radially outward belt layers, the renewed rubber material of the retreaded tire being of substantially constant thickness throughout its length and width, the retreaded tire having a radius of transverse curvature of its radially outermost crown surface as measured in a radial plane of the retreaded tire which is less in either shoulder portion than in the center portion.

8. A retreaded radial carcass tire according to claim 7, wherein the radius of transverse curvature of the center portion is at least 1¼ times that of either shoulder portion.

9. A retreaded radial carcass tire according to claim 7, wherein the radius of transverse curvature of the center portion of the outer periphery of the crown area of a retreaded tire as measured in a radial plane of the tire is approximately equal to that of the tire as originally manufactured and the radius of transverse curvature of either shoulder portion of the outer periphery of the crown area of the retreaded tire is less than that of the tire as originally manufactured.

* * * * *